United States Patent
Yoon et al.

(10) Patent No.: US 10,209,840 B2
(45) Date of Patent: Feb. 19, 2019

(54) TOUCH WINDOW AND TOUCH DEVICE

(71) Applicant: LG INNOTEK CO., LTD., Seoul (KR)

(72) Inventors: Soo Kwang Yoon, Seoul (KR); Sang Young Lee, Seoul (KR); Bo Ra Kang, Seoul (KR); Yu Won Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/492,913

(22) Filed: Apr. 20, 2017

(65) Prior Publication Data

US 2017/0308198 A1 Oct. 26, 2017

(30) Foreign Application Priority Data

Apr. 20, 2016 (KR) .................. 10-2016-0048440
Jun. 13, 2016 (KR) .................. 10-2016-0072888

(51) Int. Cl.
*G06F 3/044* (2006.01)
*G06F 3/047* (2006.01)

(52) U.S. Cl.
CPC .... *G06F 3/044* (2013.01); *G06F 2203/04102* (2013.01); *G06F 2203/04105* (2013.01); *G06F 2203/04112* (2013.01)

(58) Field of Classification Search
CPC ............. G06F 3/044; G06F 3/047; G06F 2203/04112; G06F 2203/04105; G06F 2203/04102
See application file for complete search history.

(56) References Cited

U.S. PATENT DOCUMENTS

| | | | |
|---|---|---|---|
| 2002/0025837 A1* | 2/2002 | Levy | G06F 3/0235 455/566 |
| 2003/0070833 A1* | 4/2003 | Barth | G02B 6/125 174/250 |
| 2003/0085882 A1 | 5/2003 | Lu | |
| 2011/0050586 A1 | 3/2011 | Miller et al. | |
| 2011/0291989 A1 | 12/2011 | Lee | |
| 2013/0082970 A1 | 4/2013 | Frey et al. | |
| 2013/0285970 A1* | 10/2013 | Ahn | G06F 3/044 345/173 |
| 2014/0009215 A1* | 1/2014 | Prest | G06F 3/044 327/517 |
| 2014/0160368 A1* | 6/2014 | Huang | G06F 3/044 349/12 |

FOREIGN PATENT DOCUMENTS

| | | |
|---|---|---|
| KR | 10-2004-0063142 | 7/2004 |
| KR | 10-2012-0058540 | 6/2012 |
| KR | 10-2012-0073140 | 7/2012 |
| KR | 10-2013-0018450 | 2/2013 |
| KR | 10-2013-0109090 | 10/2013 |

* cited by examiner

*Primary Examiner* — Andrew Sasinowski
(74) *Attorney, Agent, or Firm* — Ked & Associates, LLP

(57) ABSTRACT

A touch window is provided. The touch window may include a substrate including an effective region and an ineffective region, and a plurality of pressure detection members provided on the effective region. The plurality of pressure detection members may be spaced apart from each other, and the plurality of pressure detection members may include a strain gauge or a piezoelectric material.

15 Claims, 18 Drawing Sheets

TOUCH WINDOW AND TOUCH DEVICE

CROSS-REFERENCE TO RELATED APPLICATIONS

This application claims priority under 35 U.S.C. § 119 to Korean Patent Application No. 10-2016-0048440, filed in Korea on Apr. 20, 2016, and Korean Patent Application No. 10-2016-0072888, filed in Korea on Jun. 13, 2016, whose entire disclosures are incorporated herein by reference.

BACKGROUND

1. Field

Embodiments relate to a touch window and a touch device.

2. Background

Touch windows, through which images displayed on a display device may be touched using an input such as a finger or a stylus, have been applied to various electronic products. Such touch windows can be largely categorized as resistive touch windows and capacitive touch windows. In a resistive touch window, a glass and an electrode may be short-circuited by pressure from an input device, and a location of a contact point is detected. A capacitive touch window senses a change in capacitance between electrodes when a finger touches the touch window, and a location of a contact point is detected.

In addition to position detection based on touch, attention has been paid to pressure sensors that sense pressure based on a force of a touch or detects an intensity of pressure so as to perform various operations. In such a pressure sensor, it may be possible to detect pressure and magnitude of pressure, but there may be a problem in that the location where the pressure is sensed cannot be detected. Uniformity of the pressure sensed in each region may differ according to the location where the pressure sensor is provided, and thus there may be a problem in reliability and accuracy.

In a display device made with such a pressure sensor and such a touch window, there may be a problem in that a thickness thereof may be increased due to a structure of the pressure sensor being added to the touch window. Accordingly, a touch window and a touch device with a new structure capable of solving the above problems may be required.

BRIEF DESCRIPTION OF THE DRAWINGS

Embodiments will be described in detail with reference to the following drawings in which like reference numerals refer to like elements, and wherein.

DETAILED DESCRIPTION

Figure 1:
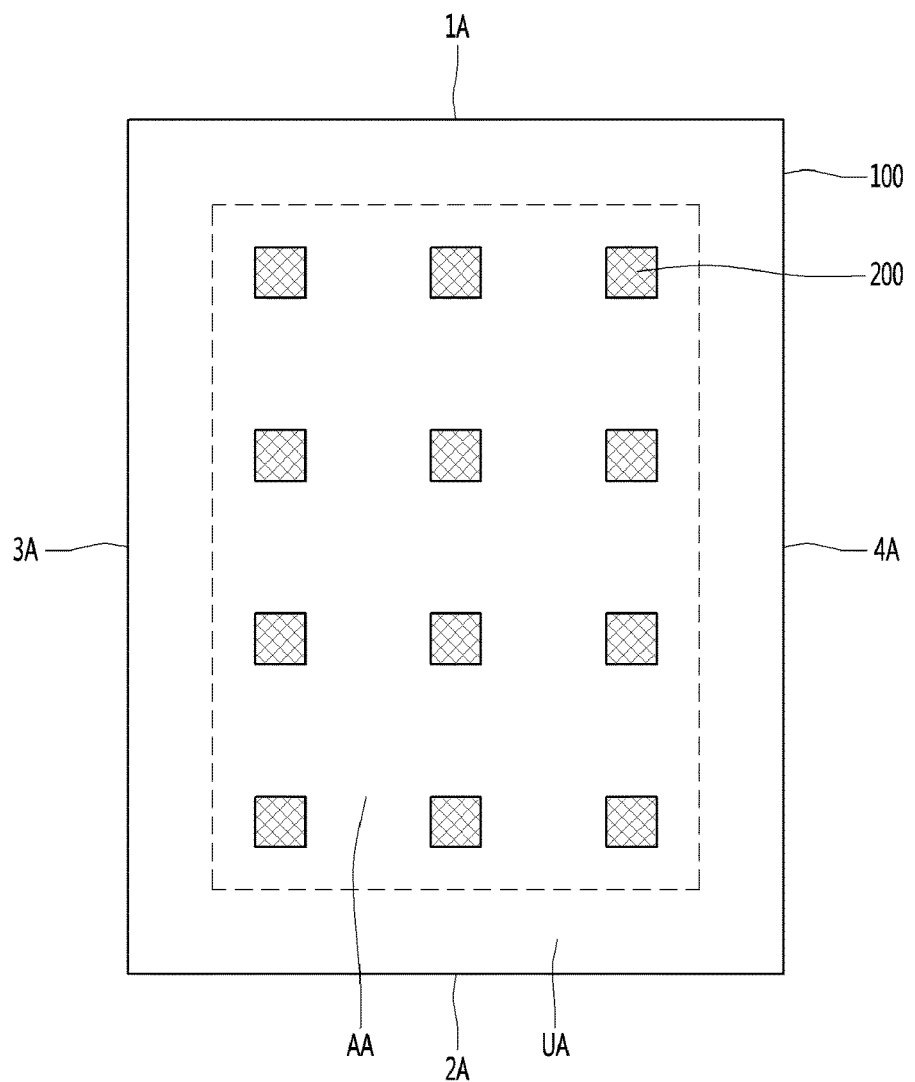
FIG. 1 is a top view of a substrate of a touch window according to embodiments.

Referring to FIG. 1, a substrate 100 may be applied to a touch window or touch device. The substrate 100 may be rigid or flexible. For example, the substrate 100 may include glass or plastic. The substrate 100 may include chemically tempered or semi-tempered glass, such as, e.g., soda lime glass or aluminosilicate glass, tempered or flexible plastic including polyimide (PI), polyethylene terephthalate (PET), propylene glycol (PPG), polycarbonate (PC), etc., or sapphire. The substrate 100 may include an isotropic optical film. For example, the substrate 100 may include cyclic olefin copolymer (COC), cyclic olefin polymer (COP), isotropic optical PC, isotropic optical polymethyl methacrylate (PMMA), etc.

Sapphire has excellent electrical characteristics, such as a dielectric constant and the like, thereby easily implementing a spaced touch, such as hovering or the like, in addition to significantly improving a touch response time. Hovering refers to a technique of recognizing coordinates even at a short distance from a display. Since sapphire has high surface strength, sapphire is also a material capable of being used as a cover substrate.

A part of the substrate 100 may have a curved surface to be curved. A part of the substrate 100 may have a flat surface, and another part thereof may have a curved surface to be curved. An end portion of the substrate 100 may have a curved surface to be curved or have a surface including a random curvature to be curved or bent.

The substrate 100 may be a flexible substrate having a flexible characteristic. The substrate 100 may be a curved or bent substrate. A touch window including the substrate 100 may also be formed to have a flexible, curved, or bent characteristic. Accordingly, the touch window according to the embodiment may be portable and may be changed into various designs.

An effective region AA and an ineffective region UA may be defined in the substrate 100. A display may operate in the effective region AA, and the display may not operate in the ineffective region UA provided around the effective region AA. A pressure and/or location of an input, for example, a finger or a stylus pen, may be detected in at least one region of the effective region AA and the ineffective region UA.

A pressure detection member 200 may be provided in the effective region AA. A plurality of pressure detection members 200 may be provided in the effective region AA. The plurality of pressure detection members 200 spaced apart from each other may be provided in the effective region AA. The pressure detection member may include various materials that detect pressure. For example, the pressure detection member may include a strain gauge. Alternatively, the pressure detection member may include a piezoelectric material.

For example, referring to FIG. 1, the plurality of pressure detection members 200 may be arranged on the effective region AA of the substrate 100 to be spaced apart from each other. The pressure detection members 200 may be arranged on the effective region of the substrate 100 to be spaced apart from each other at regular intervals. The pressure detection members 200 may be arranged on the effective region of the substrate 100 to be spaced at different intervals from each other. The pressure detection members 200 may be arranged on the effective region of the substrate 100 to be spaced apart from each other at random intervals.

The substrate 100 may include a first region 1A, a second region 2A which faces the first region 1A, and a third region 3A and a fourth region 4A which connect the first region 1A and the second region 2A and face each other. An interval between the pressure detection members 200 may be gradually reduced from the first region 1A toward the second region 2A. A density of the pressure detection members 200 may be increased from the first region 1A toward the second region 2A.

Alternatively, the interval between the pressure detection members 200 may be gradually increased from the first region 1A toward the second region 2A. The density of the pressure detection members 200 may be reduced from the first region 1A toward the second region 2A. The interval between the pressure detection members 200 may be gradually reduced from the third region 3A toward the fourth region 4A. The density of the pressure detection members 200 may be increased from the third region 3A toward the fourth region 4A.

Alternatively, the interval between the pressure detection members 200 may be gradually increased from the third region 3A toward the fourth region 4A. The density of the pressure detection members 200 may be reduced from the third region 3A toward the fourth region 4A.

Accordingly, the pressure detection members 200 may be arranged at various positions or various intervals according to purpose or use of the touch window or the touch device including the pressure detection members 200, and thus efficiency and sensitivity of the pressure detection member 200 according to the purpose or use may be maximized.

Figure 2:
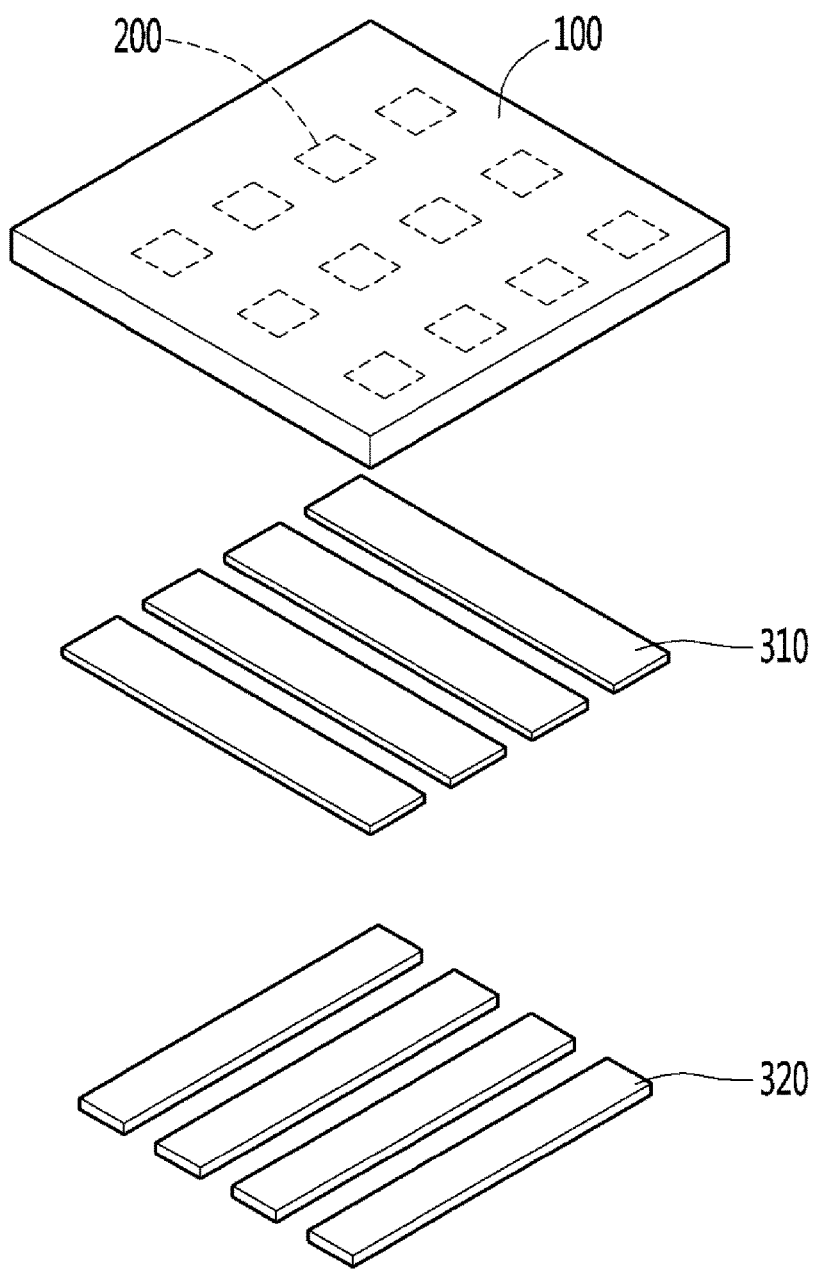
FIG. 2 is a perspective view of a touch window according to a first embodiment.

Referring to FIG. 2, a touch window according to a first embodiment may include a substrate 100, a pressure detection member 200 and a touch electrode 300. The substrate 100 may be rigid or flexible. The substrate 100 may include a material which may be the same as or similar to that in the above-described substrate. The substrate 100 may be a cover substrate. Alternatively, a separate cover substrate may be provided on the substrate 100.

Referring to FIG. 2, an effective region AA and an ineffective region UA may be defined on the substrate 100. The substrate 100 may include one surface which may be in contact with the input device and another surface opposite to the one surface. When the input device is in contact with the one surface of the substrate 100, a position and/or a pressure on a contact surface may be detected.

A deco layer 150 may be provided in the ineffective region UA of the substrate 100. The deco layer 150 may be formed with a material having a predetermined color so that a printed circuit board or the like connecting the wiring electrode provided on the ineffective region to an external circuit may not be visible from the outside. The deco layer 150 may have a color suitable for a desired exterior and, for example, may include a black or white pigment to display black or white. Alternatively, the deco layer 150 may use various color films to display various colors, such as red, blue, etc.

A desired logo or the like may be formed on the deco layer 150 using various methods. The deco layer 150 may be formed by deposition, printing, wet coating, bonding, etc. The deco layer 150 may be provided to have at least one layer. For example, the deco layer 150 may be provided as one layer or may be provided as at least two layers having different widths.

The pressure detection member 200 may be arranged on the substrate 100. The pressure detection member 200 may be arranged on the one surface of the substrate 100 which is in contact with the input device and the other surface which is opposite thereto. The pressure detection member 200 may be arranged on at least one of the effective region AA and the ineffective region UA of the substrate 100. The pressure detection member 200 may be arranged on the effective region AA of the substrate 100.

The pressure detection member 200 may include a piezoelectric material. For example, the pressure detection member 200 may include a transparent, translucent or opaque piezoelectric material. To enhance visibility of the touch window, the pressure detection member 200 may include the transparent piezoelectric material.

For example, the pressure detection member 200 may include single crystal ceramics, polycrystalline ceramics, a polymer material, a thin-film material, a composite material in which a polycrystalline material and a polymer material are mixed, or the like. The piezoelectric material of the single crystal ceramics may include $\alpha$-$AlPO_4$, $\alpha$-$SiO_2$, $LiTiO_3$, $LiNbO_3$, $Sr_xBa_yNb_2O_3$, $Pb_5$—$Ge_3O_{11}$, $Tb_2(MnO_4)_3$, $Li_2B_4O_7$, CdS, ZnO, $Bi_{12}SiO_{20}$ or $Bi_{12}GeO_{20}$. The piezoelectric material of the polycrystalline ceramics may include PZT, PT, PZT-Complex Perovskite or $BaTiO_3$. The piezoelectric material of the polymer material may include PVDF, P(VDF-TrFe), P(VDFTeFE) or TGS. The piezoelectric material of the thin-film material may include ZnO, CdS or AlN. The piezoelectric material of the composite material may include PZT-PVDF, PZT-Silicon rubber, PZT-Epoxy, PZT-foamed polymer or PZT-foamed urethane.

Since the pressure detection member 200 may include the piezoelectric material, resistance of the pressure detection member 200 may be changed when a force, i.e., a pressure is applied from one surface of the substrate 100 by the input device. When the pressure is applied by the input device, resistance of the pressure detection member 200 may be increased. Therefore, when the pressure is applied from the one surface of the substrate 100 by the input device, the pressure and an intensity of the pressure may be detected by the pressure detection member 200.

Figure 3:
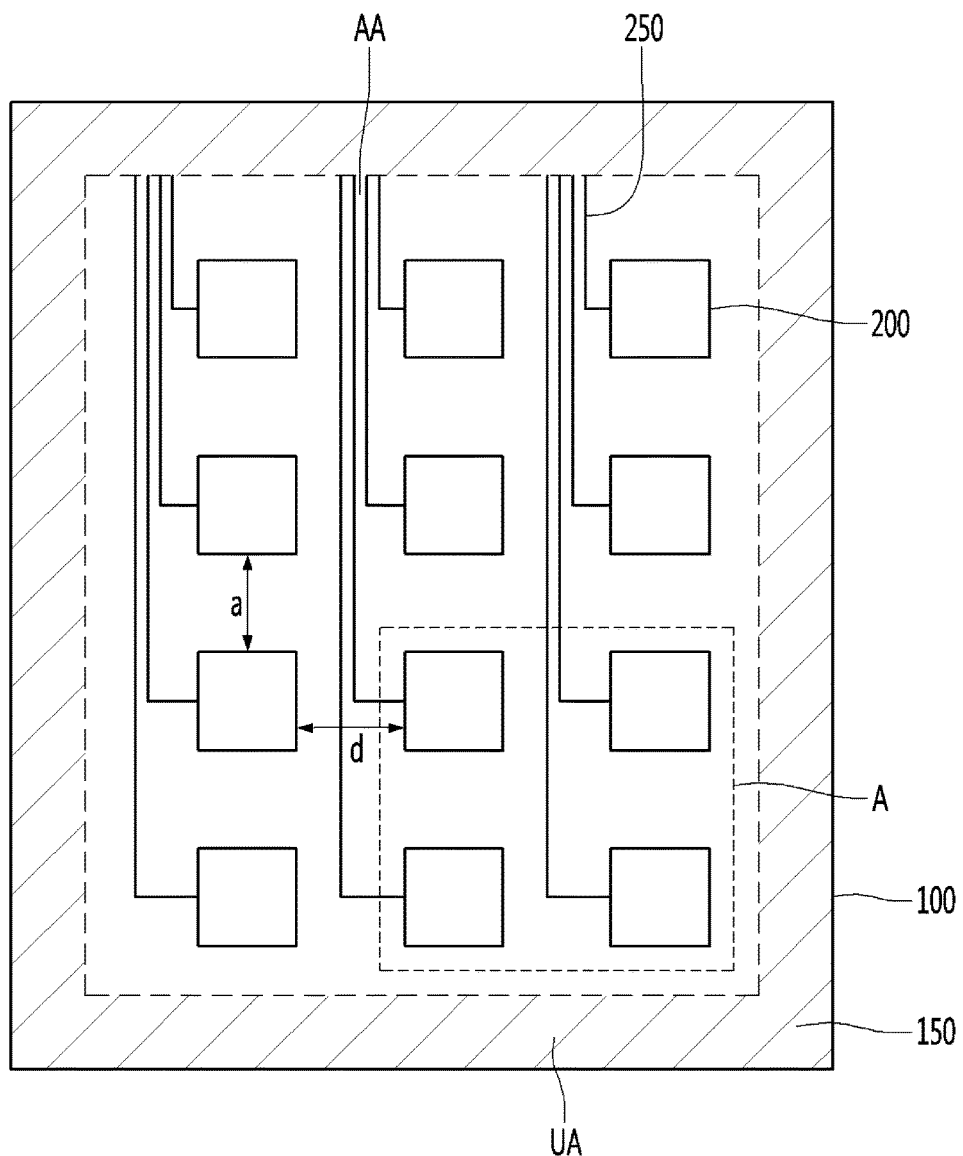
FIG. 3 is a top of a cover substrate according to the first embodiment.

Referring to FIG. 3, the pressure detection member 200 may include a plurality of pressure detecting patterns. The pressure detection member 200 may include the plurality of pressure detecting patterns arranged to be spaced apart from each other. The pressure detection member 200 may include a plurality of unit pressure detection members. The plurality of pressure detecting patterns provided at a plurality of unit regions may be arranged on the cover substrate 100. The pressure detecting patterns may be arranged to extend in a row direction and/or a column direction of the substrate 100 while spaced apart from each other.

FIG. 3 illustrates a state in which each of the pressure detecting patterns may be formed in a rectangular shape. However, the present disclosure is not limited thereto, and each of the pressure detecting patterns may be formed in various shapes, such as, e.g., a circular shape, an elliptical shape, a triangular shape, a diamond shape and a bar shape.

A wiring electrode 250 may be connected to one end of each of the pressure detecting patterns. The wiring electrode 250 may be connected to the pressure detecting patterns, may extend toward an upper side of the substrate 100 and may be connected to a printed circuit board on which a driving chip is mounted. Accordingly, the pressure and the intensity of the pressure which are detected by the pressure detecting patterns may be transmitted to the driving chip through the wiring electrode, and an operation corresponding to detection of the pressure may be performed.

The wiring electrode 250 may include a transparent conductive material. The wiring electrode 250 may include a transparent conductive material so that transmission of light is not blocked and a current flows therethrough. For example, the wiring electrode 250 may include a metal oxide such as indium tin oxide, indium zinc oxide, copper oxide, tin oxide, zinc oxide, titanium oxide, etc. Accordingly, when a flexible and/or bent touch device is manufactured, a degree of freedom thereof may be improved. When a flexible and/or bent touch device is manufactured, a degree of freedom may be enhanced, and visibility may also be enhanced because the wiring electrode may not be visible from an outside.

The pressure detecting patterns may be arranged to be spaced at regular intervals. For example, an interval d between the pressure detecting patterns may be about 5 mm or less. The interval d between the pressure detecting patterns may be about 1 mm to about 5 mm. The interval d between the pressure detecting patterns may be about 3 mm to about 5 mm.

When the interval d between the pressure detecting patterns exceeds about 5 mm, a region in which the input, e.g., a finger, is in contact with the cover substrate is not overlapped with a region in which the pressure detecting patterns are arranged may be generated. Therefore, when the input device comes in contact with the substrate and pressure is applied, a region in which the pressure is not recognized may be generated, and reliability and accuracy may be degraded.

When the interval d between the pressure detecting patterns is less than about 1 mm, the pressure detecting patterns in a unit region may be in contact with each other due to tolerance in a process. Therefore, even when the pressure is applied to other unit regions different from each other, it may be recognized that the pressure is detected at the same positions, and thus the reliability and the accuracy may be degraded.

Figure 4:
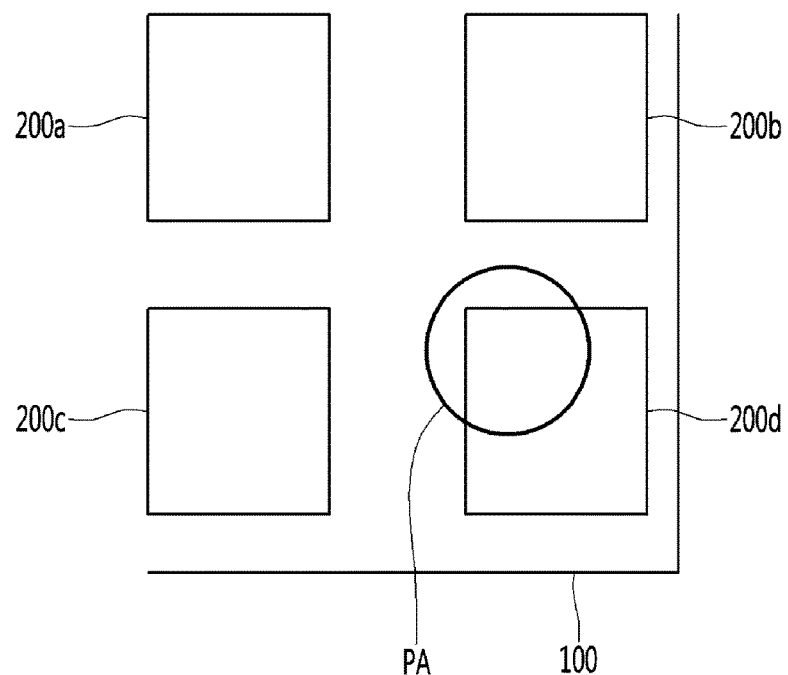
FIG. 4 to FIG. 6 are views illustrating pressure detection of the touch window according to the first embodiment.
Figure 5:
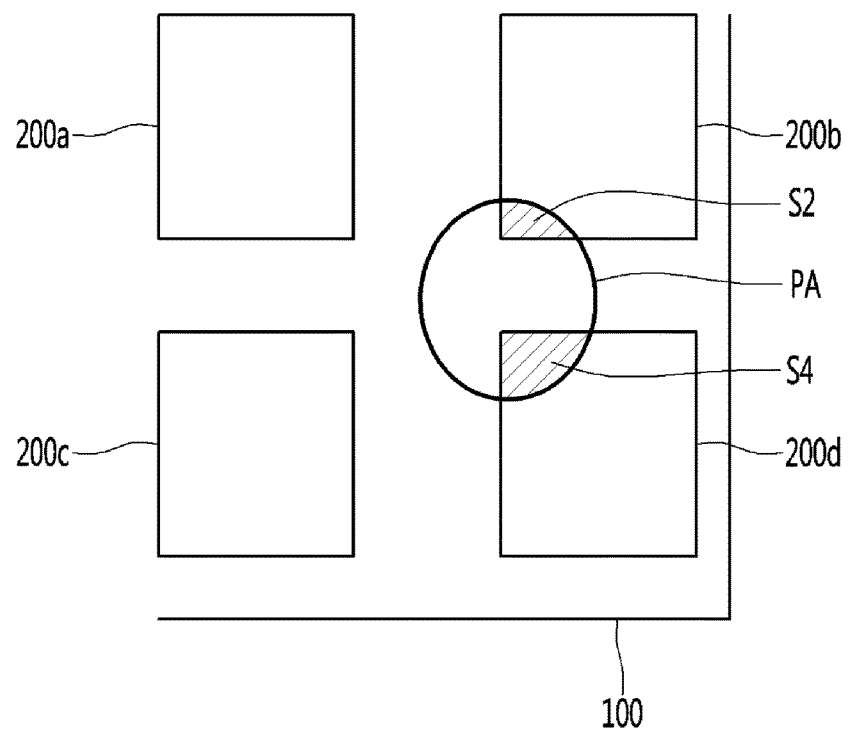
Figure 6:
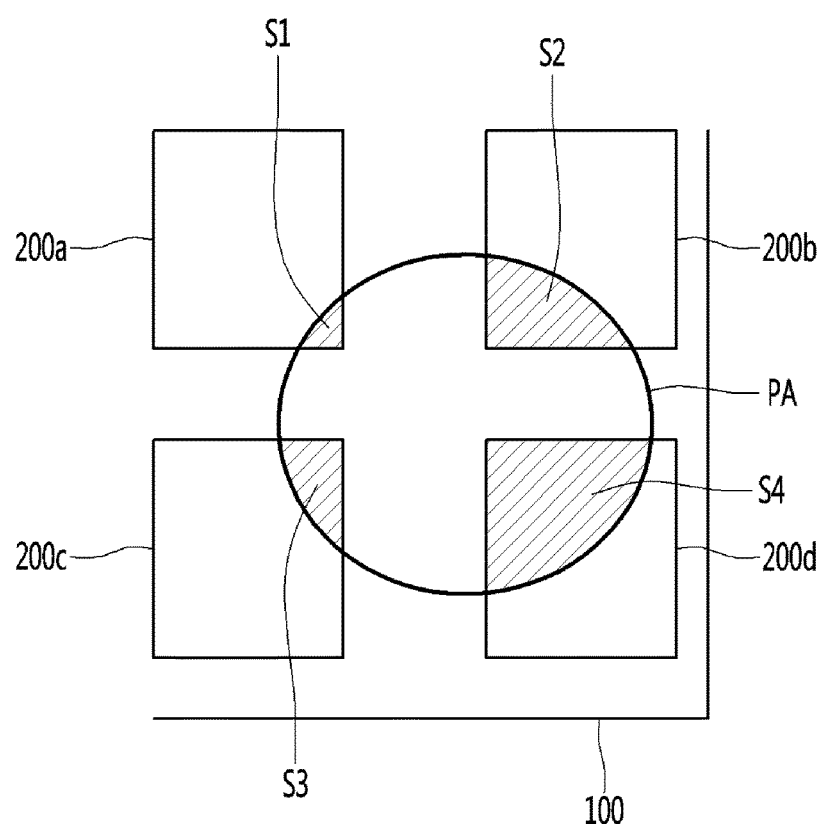

FIG. 4 to FIG. 6 are enlarged views of a region A of FIG. 3 and views illustrating a state in which a pressure detecting position may be changed according to a region of one surface of the substrate to which the pressure may be applied. Referring to FIG. 4 to FIG. 6, the pressure detection member according to the embodiment may include a first pressure detecting pattern 200a, a second pressure detecting pattern 200b, a third pressure detecting pattern 200c and a fourth pressure detecting pattern 200d, and a pressure region PA having a predetermined surface area may be applied from one surface of the cover substrate.

Referring to FIG. 4, the pressure region PA may correspond to only a region in which the fourth pressure detecting pattern 200d is arranged. The pressure region PA may be overlapped with only the region in which the fourth pressure detecting pattern 200d is arranged. In this case, the pressure and/or the intensity of the pressure may be detected at a position of the region in which the fourth pressure detecting pattern 200d is arranged.

Referring to FIG. 5, the pressure region PA may correspond to only a region in which the second pressure detecting pattern 200b and the fourth pressure detecting pattern 200d are arranged. The pressure region PA may be overlapped with a plurality of pressure detecting patterns 200b and 200d. In this case, a region in which the pressure and/or the intensity of the pressure are detected may be determined in consideration of a size S2 of a region in which the pressure region PA is overlapped with the second pressure detecting pattern 200b and a size S4 of a region in which the pressure region PA is overlapped with the fourth pressure detecting pattern 200d. The size of each of the regions in which the pressure detecting patterns are overlapped with the pressure region PA may be different according to each of the patterns.

In FIG. 5, since the size S4 of the region in which the pressure region PA is overlapped with the fourth pressure detecting pattern 200d is larger than the size S2 of the region in which the pressure region PA is overlapped with the second pressure detecting pattern 200b, the pressure and/or the intensity of the pressure may be detected at the position of the region in which the fourth pressure detecting pattern 200d is arranged.

Referring to FIG. 6, the pressure region PA may correspond to all of the regions in which the first pressure detecting pattern 200a, the second pressure detecting pattern 200b, the third pressure detecting pattern 200c and the fourth pressure detecting pattern 200d are arranged.

The pressure region PA may be overlapped with the plurality of pressure detecting patterns 200a to 200d. In this case, the region in which the pressure and/or the intensity of the pressure are detected may be determined in consideration of a size S1 of a region in which the pressure region PA is overlapped with the first pressure detecting pattern 200a, the size S2 of the region in which the pressure region PA is overlapped with the second pressure detecting pattern 200b, a size S3 of a region in which the pressure region PA is overlapped with the third pressure detecting pattern 200c and the size S4 of the region in which the pressure region PA is overlapped with the fourth pressure detecting pattern 200d, similarly to FIG. 5. The size of each of the regions in which the pressure detecting patterns are overlapped with the pressure region PA may be different according to each of the patterns.

In FIG. 6, since the size S4 of the region in which the pressure region PA is overlapped with the fourth pressure detecting pattern 200d is larger than the size of other regions, the pressure and/or the intensity of the pressure may be detected at the position of the region in which the fourth pressure detecting pattern 200d is arranged.

In the touch window according to the first embodiment, the plurality of pressure detecting patterns may be arranged on the substrate to be spaced apart from each other. Each of the pressure detecting patterns may be arranged in the imaginary unit region of the substrate, and the pressure detecting patterns arranged in each of the unit regions may be arranged on the cover substrate to be spaced apart from each other. Accordingly, when the pressure is applied on the substrate by the input device, the pressure and/or the intensity of the pressure may be detected at the position of the region to which the pressure is applied. The touch window according to the first embodiment may detect the pressure by the plurality of pressure detecting patterns arranged on the substrate, may also accurately detect the position to which the pressure is applied and thus may accurately detect the pressure and the position to which the pressure is applied with only the pressure detection member.

Figure 7:
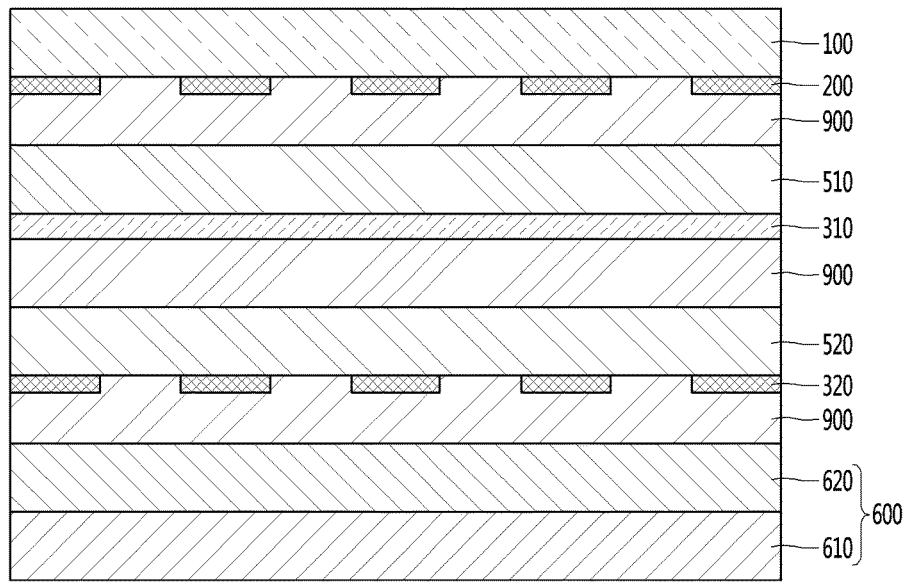
FIG. 7 to FIG. 10 are cross-sectional views of the touch window according to the first embodiment.

Referring to FIG. 7 to FIG. 10, the touch window according to the first embodiment may further include a touch electrode on the substrate 100 and may also be coupled to a display panel, thereby realizing a touch device. Referring to FIG. 7, in the touch window according to the first embodiment and the touch device including the same, the pressure detection members 200 may be provided on the substrate 100, and the touch electrodes may be provided on the pressure detection members 200.

A first touch electrode 310 provided on a first substrate 510 and a second touch electrode 320 provided on a second substrate 520 may be provided on the pressure detection members 200. The first touch electrode 310 and the second touch electrode 320 may include a transparent conductive material so that transmission of light is not blocked and current flows therethrough. For example, the first touch electrode 310 and the second touch electrode 320 may include a metal oxide such as indium tin oxide, indium zinc oxide, copper oxide, tin oxide, zinc oxide, titanium oxide, etc. Accordingly, when a flexible and/or bent touch device is manufactured, a degree of freedom thereof may be improved.

Alternatively, the first touch electrode 310 and the second touch electrode 320 may include a nanowire, a photosensitive nanowire film, a CNT, graphene, a conductive polymer, or a mixture thereof. Accordingly, when a flexible and/or bent touch device is manufactured, a degree of freedom thereof may be improved. When a nano-composite, such as a nanowire or CNT, is used, black may be displayed and it may be advantageous for securing electrical conductivity and controlling color and reflectivity by controlling content of a nano-powder.

The first touch electrode 310 and the second touch electrode 320 may include various metals. For example, the touch electrode may include at least one metal among chromium (Cr), nickel (Ni), copper (Cu), aluminum (Al), silver (Ag), molybdenum (Mo), gold (Au), titanium (Ti), and an alloy thereof. Accordingly, when a flexible and/or bent touch device is manufactured, a degree of freedom thereof may be improved.

The first touch electrode 310 and the second touch electrode 320 may be provided in a mesh shape. For example, the first touch electrode 310 and the second touch electrode 320 may include a plurality of sub electrodes provided to intersect each other, and the first touch electrode 310 and the second touch electrode 320 may be provided in a mesh shape as a whole by the sub electrodes.

Since the first touch electrode 310 and the second touch electrode 320 has a mesh shape, a pattern of the first touch electrode 310 and the second touch electrode 320 may be hidden in the effective region. Even when the first touch electrode 310 and the second touch electrode 320 is formed of a metal, the pattern may be hidden. Further, even when the first touch electrode 310 and the second touch electrode 320 is applied to a large touch window, resistance of the touch window can be reduced.

The first touch electrode 310 and the second touch electrode 320 may include mesh wires formed by the plurality of sub electrodes which intersect each other and mesh openings between the mesh wires. A width of the mesh wire may be in a range of about 0.1 μm to 10 μm. It may not be possible to make a mesh wire having a width that is less than about 0.1 μm, and when the width is greater than about 10 μm, a detection electrode pattern may be exposed to the outside, thereby degrading visibility. The width of the mesh wire may be in a range of about 1 μm to 5 μm. The width of the mesh wire may be in a range of about 1.5 μm to 3 μm.

A thickness of the mesh wire may be in a range of about 100 nm to 500 nm. When the thickness of the mesh wire is less than about 100 nm, electrode resistance may be increased and an electrical characteristic may be degraded. When the thickness is greater than about 500 nm, a thickness of the entire touch window is increased, and process efficiency may be degraded. The thickness of the mesh wire may be in a range of about 150 nm to 200 nm. The thickness of the mesh wire may be in a range of about 180 nm to 200 nm.

The substrate 100 and the first substrate 510, and the first substrate 510 and the second substrate 520 may be bonded to each other through an adhesive layer 900 such as an optically clear adhesive. A display panel 600 may be provided on the touch electrode, specifically, the second touch electrode 320. The second substrate 520 and the display panel 600 may be bonded to each other through the adhesive layer 900 such as the optically clear adhesive (OCA and OCR).

The display panel 600 may include a 1-1$^{st}$ substrate 610 and a 1-2$^{nd}$ substrate 620. When the display panel 600 is a liquid crystal display, the display panel 600 may be formed to have a structure in which the 1-1$^{st}$ substrate 610 including a thin film transistor (TFT) and a pixel electrode and the 1-2$^{nd}$ substrate 620 including color filter layers are bonded with a liquid crystal layer interposed therebetween.

The display panel 600 may be a liquid crystal display panel having a color filter on transistor (COT) structure in which a TFT, a color filter, and a black matrix are formed on the first substrate 610 and the second substrate 620 and the first substrate 610 may be adhered to each other with a liquid crystal layer interposed therebetween. A TFT may be formed on the first substrate 610, a protective film may be formed on the TFT, and a color filter layer may be formed on the protective film. Further, a pixel electrode in contact with the TFT may be formed on the first substrate 610. A black matrix may be omitted to improve an opening ratio and simplify a mask process, and a common electrode may be formed to serve as the black matrix. When the display panel 600 is a liquid crystal display panel, the display device may further include a backlight unit which provides light to a rear surface of the display panel 600.

When the display panel 600 is an organic electroluminescence display panel, the display panel 600 may include a self-light emitting element which does not need a separate light source. In the display panel 600, a TFT may be formed on the first substrate 610, and an organic light emitting element in contact with the TFT may be formed thereon. The organic light emitting element may include a positive electrode, a negative electrode, and an organic light emitting layer formed between the positive electrode and the negative electrode. The display panel 600 may further include the second substrate 620, which may serve as an encapsulating substrate for encapsulation, provided on the organic light emitting element.

Figure 8:
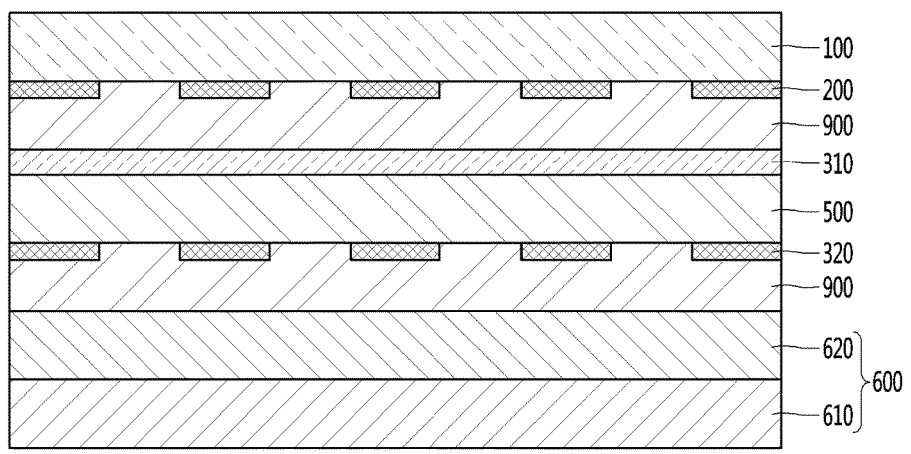

Referring to FIG. 8, the first touch electrode 310 and the second touch electrode 320 may be provided on one electrode substrate. The pressure detection member 200 may be provided on the substrate 100, and an electrode basic material 500 may be provided on the pressure detection member 200.

The first touch electrode 310 and the second touch electrode 320 may be provided on both surfaces of the electrode basic material 500. The first touch electrode 310 may be provided on one surface of the electrode basic material 500, and the second touch electrode 320 may be provided on the other surface of the electrode basic material 500. Both of the first touch electrode 310 and the second touch electrode 320 may be provided on one electrode substrate. Since the adhesive layer and the basic material for supporting the touch electrode are partially omitted, an entire thickness of each of the touch window and the touch device including the same may be reduced.

Figure 9:
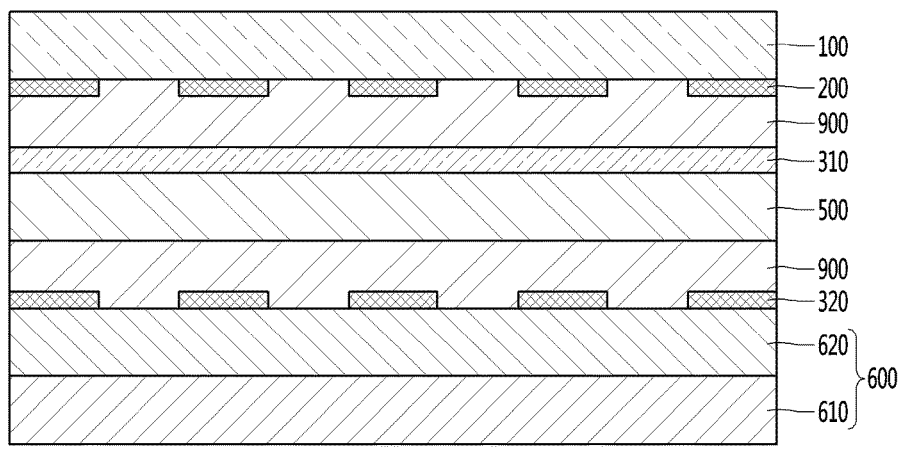

Referring to FIG. 9, the first touch electrode 310 or the second touch electrode 320 may be provided on the display panel 600. The pressure detection member 200 may be provided on the cover substrate 100, and the electrode basic material 500 may be provided on the pressure detection member 200. The first touch electrode 310 may be provided on the electrode basic material 500. The display panel 600 may be provided on the electrode basic material 500. The electrode basic material 500 and the display panel 600 may be bonded to each other through the adhesive layer 900 such as the optically clear adhesive.

The second touch electrode 320 may be provided on the display panel 600. The second touch electrode 320 may be provided on the 1-2$^{nd}$ substrate 610. Since the adhesive layer and the substrate for supporting the touch electrode are partially omitted, the entire thickness of each of the touch window and the touch device including the same may be reduced.

Figure 10:
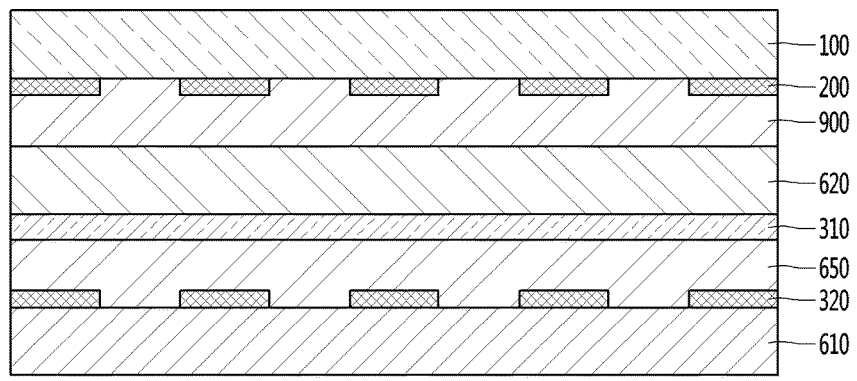

Referring to FIG. 10, the first touch electrode 310 and the second touch electrode 320 may be provided inside the display panel 600. The pressure detection member 200 may be provided on the substrate 100, and the display panel 600 may be provided on the pressure detection member 200. The substrate 100 and the display panel 600 may be boned to each other through the adhesive layer 900 such as the optically clear adhesive.

The first touch electrode 310 and the second touch electrode 320 may may be provided inside the display panel 600. The first touch electrode 310 and the second touch electrode 320 may be provided between the 1-1$^{st}$ substrate 610 and the 1-2$^{nd}$ substrate 620.

For example, the first touch electrode 310 may be provided on the 1-2$^{nd}$ substrate 620, and the second touch electrode 320 may be provided on the 1-1$^{st}$ substrate 610. An insulation layer 650 may be provided between the first touch electrode 310 and the second touch electrode 320, and the first touch electrode 310 and the second touch electrode 320 may be prevented from being electrically connected to each other. Therefore, since the adhesive layer and the substrate for supporting the touch electrode are partially omitted, the entire thickness of each of the touch window and the touch device including the same may be reduced.

Hereinafter, a touch window and a touch device according to a second embodiment will be described with reference to FIG. 11 to FIG. 18. In description of the touch window and the touch device according to the second embodiment, a description which is the same as or similar to that of the touch window and the touch device according to the first embodiment has been omitted, and the same elements may be designated by the same reference numerals.

Figure 11:
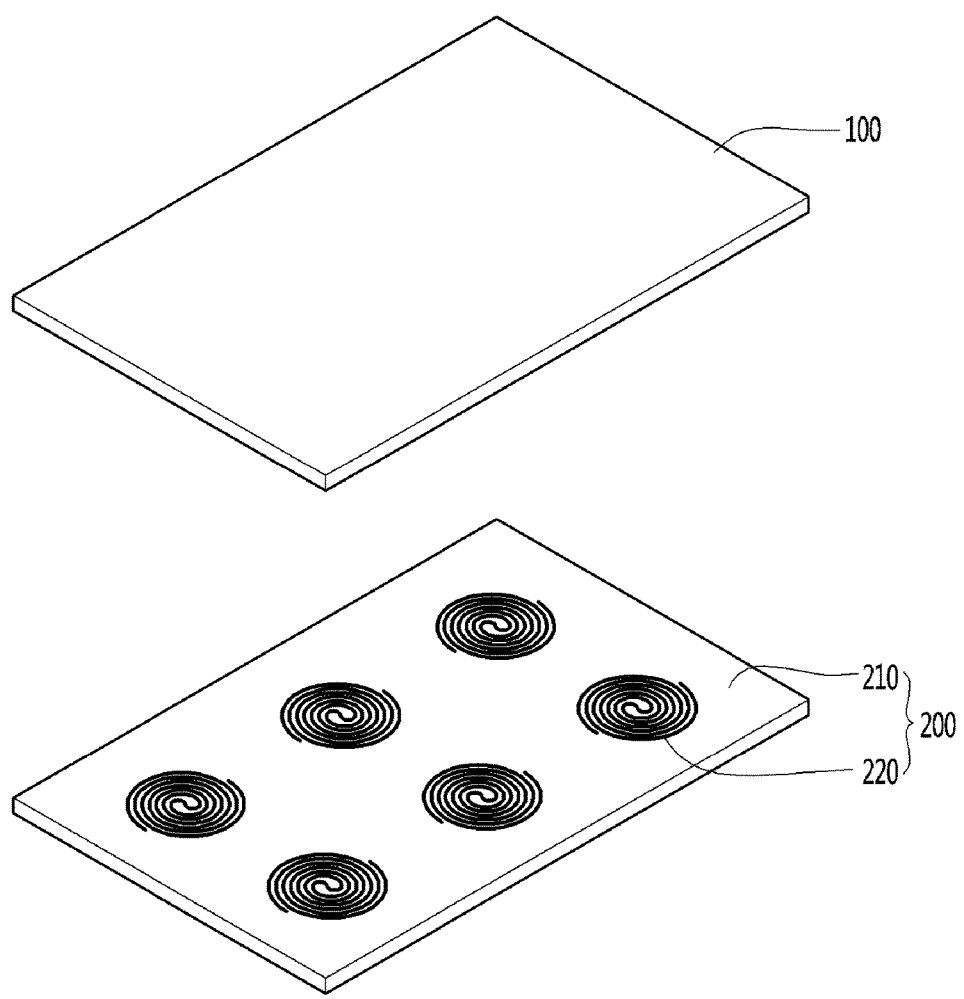
FIG. 11 is an exploded perspective view of a touch window according to a second embodiment.

Referring to FIG. 11 to FIG. 18, the touch device according to the second embodiment may include a touch window and a display panel 600. The display panel 600 may include a 1-1$^{st}$ substrate 610 and a 1-2$^{nd}$ substrate 620. Referring to FIG. 11, the touch window may include a substrate 100 and a pressure detection member 200.

The touch window may be provided on the display panel 600. The touch window and the display panel 600 may be bonded to each other through an adhesive layer 900 or the like. For example, the substrate 100 and the display panel 600 may be provided to be bonded to each other through an optically clear adhesive (OCA), an optically clear film (OCF) or the like.

The substrate 100 may be a cover substrate. A separate cover substrate may be further provided on the substrate 100. An effective region AA and an ineffective region UA may be defined in the substrate 100.

A deco layer and electrodes may be provided on the substrate 100. A deco layer 150 may be provided on the ineffective region UA of the substrate 100. A pressure detection member 200 may be provided on the effective region AA of the substrate 100.

Figure 13:
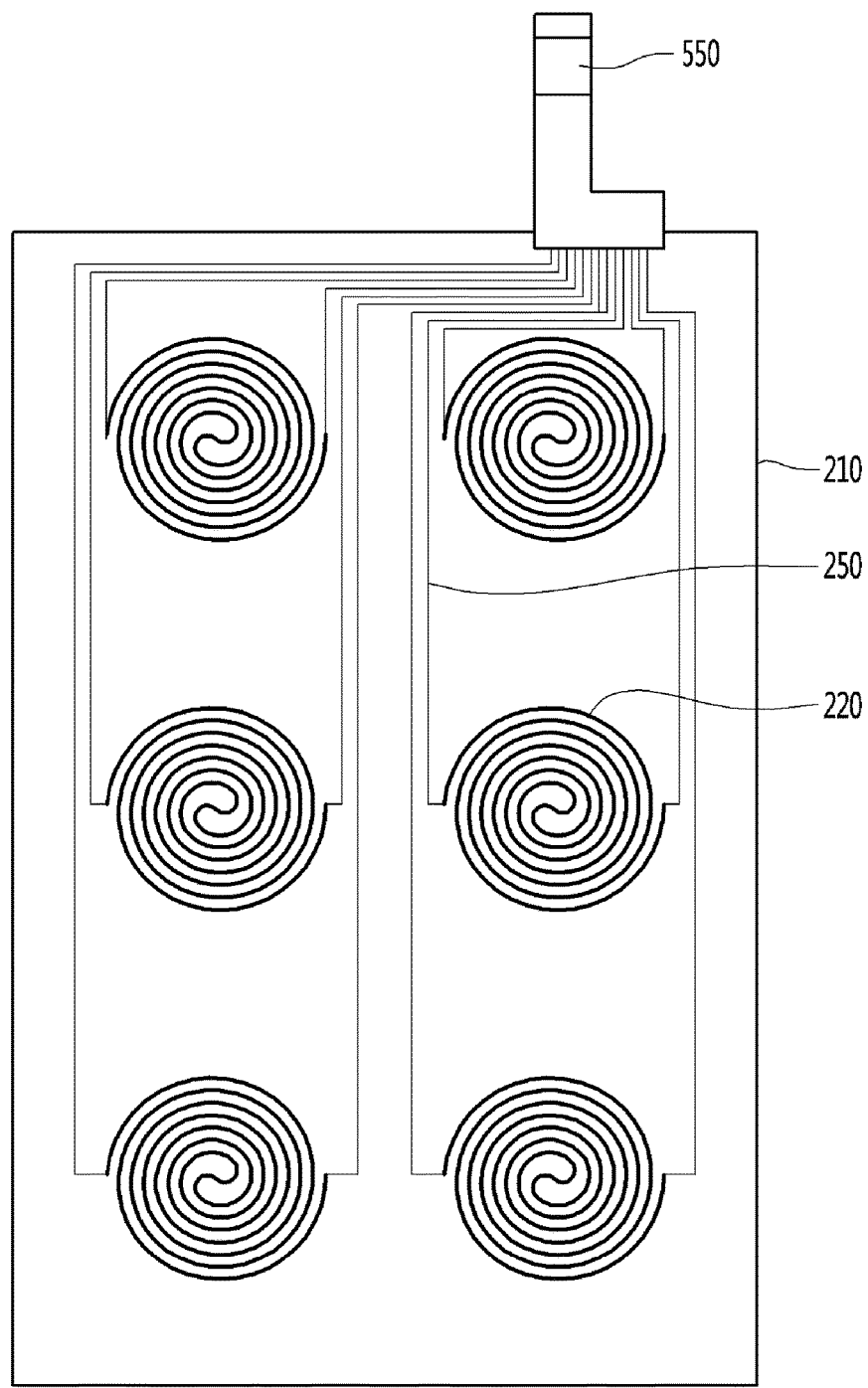
FIG. 13 is a top view of the touch window according to the second embodiment.

Referring to FIG. 11 and FIG. 13, the pressure detection member 200 may include a base substrate 210, a pressure detecting electrode 220 provided on the base substrate 210, and a protective layer 230 provided on the pressure electrode 220. For example, the pressure detection member 200 may be a strain gauge. The strain gauge may be made by forming a metal thin film in a lattice state on a thin electrical insulator formed of a resin, and has a gauge lead including a lead cable attached thereto.

Generally, an electrical resistor has resistance which blocks a current, and a value of the resistor depends on a material thereof, but the value may be generally high when a thickness thereof is small and a length thereof is great. Accordingly, when the resistor is pulled, resistance thereof may be increased because the resistor is thinned and elongated, and when the resistor is pressed, the resistance thereof may be decreased inversely. As the strain gauge may be made using the above principle, the resistance of the strain gauge may be changed by a pressure applied by the input device, and thus a change in the pressure may be detected on the basis of a change in the resistance.

The base substrate 210 may include plastic. The base substrate 210 may be flexible. For example, the base substrate 210 may include a material which is the same as or similar to that of the above-described substrate 100. For example, the base substrate 210 may include sapphire or a tempered or flexible plastic including PI, PET, PPG, PC, etc.

The width of the base substrate 210 may be in a range of about 50 μm to 100 μm. The pressure electrode 220 may be provided on the base substrate 210. The pressure electrode 220 may be provided to be in direct or indirect contact with the base substrate 210. However, the embodiment is not limited thereto, and the pressure detecting electrode 220 may be provided on the substrate 100. For example, the pressure detecting electrode 220 may be provided on the substrate 100 which is the cover substrate or may be provided on the substrate 100 which is provided on the cover substrate. The pressure detecting electrode 220 may be provided to be in direct contact with one surface of the base substrate 210.

The pressure detecting electrode 220 may include a conductive material. The pressure detecting electrode 220 may be transparent. Therefore, even when the pressure detecting electrode 220 is provided on the effective region of the substrate 100, the pressure detecting electrode 220 may be prevented from being visible from an outside. For example, the pressure detecting electrode 220 may include a material which is the same as or similar to that of the above-described touch electrode. Also, the pressure detecting electrode 220 may be formed to have a mesh shape, like the above-described touch electrode.

Further, the pressure detecting electrode 220 may be formed in various shapes such as a zigzag pattern including a plurality of protruding regions or a lattice pattern. An interval between the protruding regions may be variously formed according to a length and a width of a touch detecting electrode overlapped with the pressure detecting electrode 220. Since the pressure detecting electrode 220 is formed to have the various shapes such as the zigzag shape, a moire phenomenon which may occur by the pressure detecting electrode 220 and the touch detecting electrode overlapped with the pressure detecting electrode 220 may be prevented, and thus the visibility may be enhanced.

At least one or more pressure detecting electrodes 220 may be provided on the base substrate 210. For example, a plurality of pressure detecting electrodes 220 may be provided on the base substrate 210 to be spaced apart from each other. Therefore, the force or the pressure applied from one surface of the substrate 100 may be further accurately detected.

The pressure detecting electrode 220 may be formed to have various shapes. For example, referring to FIG. 13, the pressure detecting electrode 220 may be formed to have a circular shape. The pressure detecting electrode 220 may be formed to have a coil shape. The pressure detecting electrode 220 may be formed to have a spiral shape. For example, the pressure detecting electrode 220 may be formed in a Fermat's spiral shape to be wound from one end and the other end thereof in opposite directions to each other.

The pressure detecting electrode 220 may be formed to be wound around at least one center axis extending vertically to the substrate 100 or the base substrate 210 in at least one direction. The pressure detecting electrode 220 may be formed so that one end and the other end thereof are provided outside the pressure detecting electrode 220 to be wound about the center axis.

For example, the one end may be wound around the center axis in one direction, and another end may be wound around the center axis in a direction other than the one direction. The pressure detecting electrode 220 may be formed so that the one end and the other end thereof are wound about the center axis while extending inward from an outside. A position of the pressure detecting electrode 220 may be changed by a force applied by the input device.

A wiring electrode 250 may be provided on the one end and the other end of the pressure detecting electrode 220. The wiring electrode 250 may be connected to correspond to the pressure detecting electrode 220. For example, the wiring electrode 250 may include a first sub-wiring electrode connected to one end of the pressure detecting electrode 220 and a second sub-wiring electrode connected to the other end of the pressure detecting electrode 220.

Figure 17:
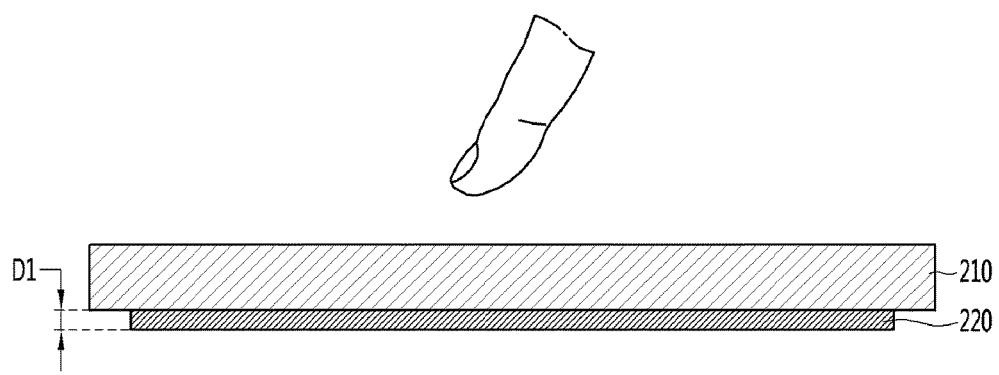
FIG. 17 and FIG. 18 are views illustrating a pressure detecting electrode that changes as pressure is applied.

Referring to FIG. 17, when the pressure is applied on one surface of the substrate 100 by the input such as the finger, one surface of the pressure detecting electrode 220 on the base substrate 210 and one surface of the base substrate 210 may be located to be spaced apart at a first distance D1. The one surface in which the base substrate 210 is in contact with the pressure detecting electrode 220 and the other surface opposite to the one surface in which the pressure detecting electrode 220 is in contact with the base substrate 210 may be located to be spaced apart from each other at the first distance D1.

Figure 18:
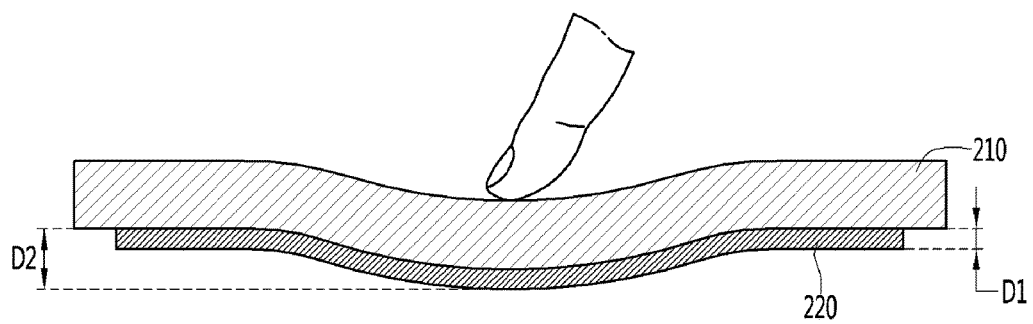

However, referring to FIG. 18, when the pressure is applied on one surface of the substrate 100 by the input such as the finger, a position of the pressure detecting electrode 220 may be changed in a region in which the pressure is applied and a region in which the pressure is not applied.

In the region in which the pressure is not applied, the one surface in which the base substrate 210 is in contact with the pressure detecting electrode 220 may be located to be spaced apart from the other surface opposite to the one surface in which the pressure detecting electrode 220 is in contact with the base substrate 210 at the first distance D1. In the region in which the pressure is applied, the one surface in which the base substrate 210 is in contact with the pressure detecting electrode 220 may be located to be spaced apart from the other surface opposite to the one surface in which the pressure detecting electrode 220 is in contact with the base substrate 210 at a second distance D2.

In the region in which the pressure is applied, the distance between the one surface in which the base substrate 210 is in contact with the pressure detecting electrode 220 and the other surface opposite to the one surface in which the pressure detecting electrode 220 is in contact with the base substrate 210 may be increased, and thus a resistance of the pressure detecting electrode 220 may be changed. In the region in which the pressure is applied, i.e., in which the distance of the pressure detecting electrode 220 is increased, the resistance may be increased. The touch window according to the embodiment may detect the force or the pressure applied to the cover substrate and the intensity thereof according to a change amount of the resistance value.

The wiring electrode 250 may be connected to one end and the other end of the pressure detecting electrode 220. The wiring electrode 250 may transmit the above-described change amount of the resistance to a driving chip mounted on the printed circuit board 550 provided on the ineffective region UA, and the pressure and the intensity of the pressure may be detected by the change amount of the resistance.

The protective layer 230 may be provided on the pressure electrode 220. For example, the protective layer 230 may be provided to be in direct or indirect contact with the pressure electrode 220. The protective layer 230 may include a resin material. For example, the protective layer 230 may include at least one resin among an acrylic resin, a silicone resin, a urethane resin, and an epoxy resin.

Figure 16:
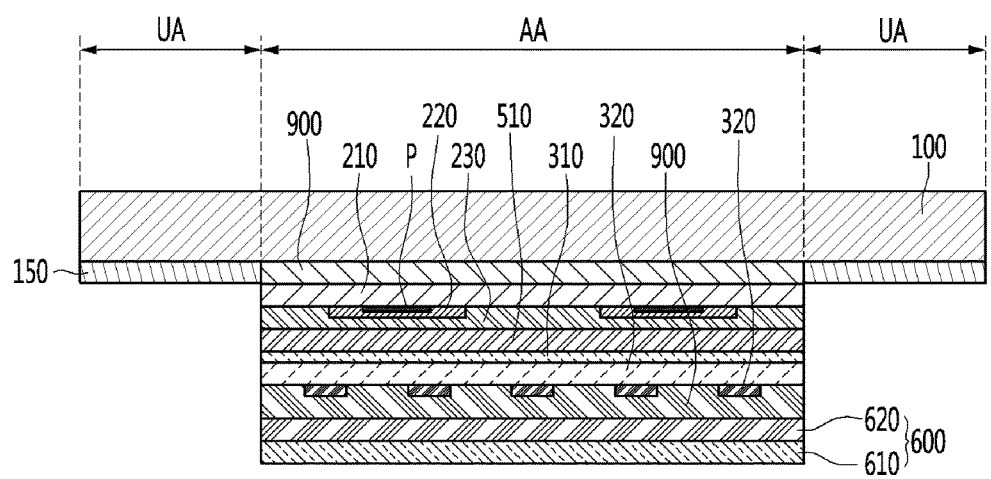

Referring to FIG. 16, the pressure detection member 200 may include a protruding portion P. The protruding portion P may be formed on the base substrate 210. The protruding portion P may be provided at a position corresponding to the pressure detecting electrode 220.

A region in which the protruding portion P is formed and a region in which the pressure detecting electrode 220 is provided may be overlapped with each other.

The protruding portion P may be formed in various shapes. For example, the protruding portion P may be formed in various shapes, such as, e.g., a hemispheric shape, a rectangular shape and a triangular shape.

The sensitivity of the pressure detecting electrode 220 according the pressure may be enhanced by the protruding portion P. The protruding portion P may be provided in a region corresponding to the pressure detecting electrode 220. When the protruding portion P is provided on a region corresponding to the pressure detecting electrode 220 and the force or the pressure is applied on the substrate by the input device or the like, the pressure detecting electrode 220 may come in contact with the protruding portion P, and thus the sensitivity and the accuracy of the pressure detecting electrode 220 may be enhanced.

In the touch device according to the second embodiment, an electrode that directly detects the pressure can be provided on the substrate. The pressure detecting electrode can be provided on the effective region of the substrate. Accordingly, the substrate and the pressure detecting electrode can be integrated with each other.

In the touch device according to the second embodiment, a separate pressure detecting layer which detects the pressure can be omitted. An increase in a thickness of the touch device due to the separate pressure detecting layer can be prevented, and the touch device having a slim thickness can be realized. Furthermore, since the pressure detecting electrode is provided on the effective region of the substrate, an arrangement position of the touch detecting electrode may not be limited, and thus the present disclosure can be applied to various types of touch devices.

Referring to FIG. 12 and FIG. 14 to FIG. 16, a touch electrode may be provided on the effective region AA of the substrate 100. In the effective region AA, a position of the input device may be detected. When the input device is in contact with a point of the effective region, a capacitance difference between the touch electrodes occurs at a portion which is in contact with the input device, and the portion in which such a difference occurs may be detected as a contact position.

The touch electrodes may include a first touch electrode 310 and a second touch electrode 320. The touch electrode may include a transparent conductive material which allows electric power to flow without an interruption to light transmission. The touch electrode may include a material which is the same as or similar to that in the touch electrode described in the first embodiment. Also, the touch electrode may be formed in a mesh shape. The touch electrode may be provided at various positions.

Figure 12:
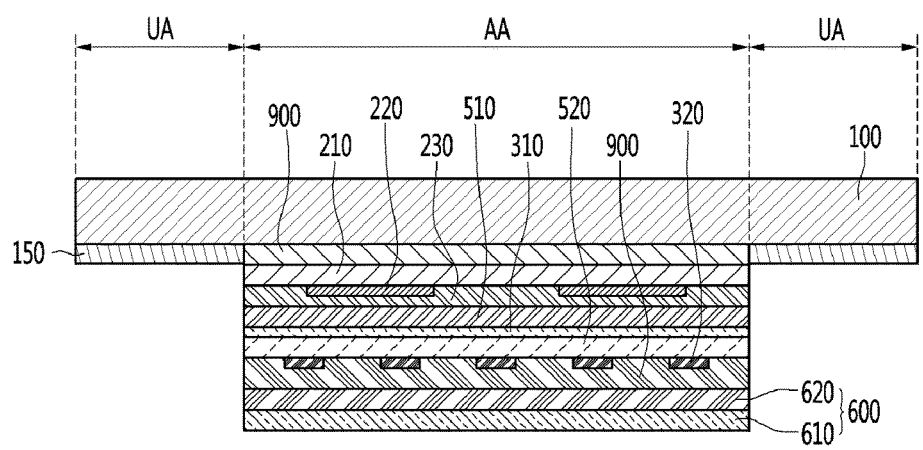
FIG. 12 is a cross-sectional view of a touch device according to the second embodiment.

Referring to FIG. 12, the touch electrode may be provided on the substrate 100. For example, a first substrate 510 may be provided on the substrate 100, and the first touch electrode 310 may be provided on the first substrate 510. A second substrate 520 may be provided on the first substrate 510, and the second touch electrode 320 may be provided on the second substrate 520.

Figure 14:
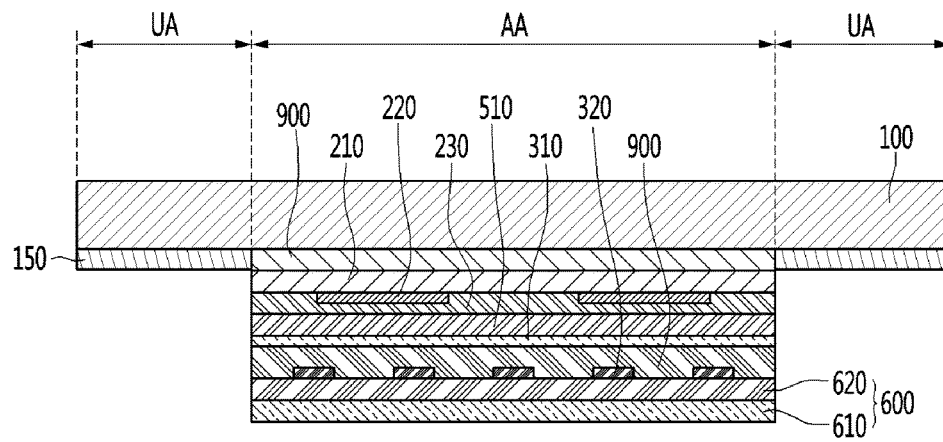
FIG. 14 to FIG. 16 are cross-sectional views of the touch device according to a position of a touch electrode of the second embodiment.

Referring to FIG. 14, the touch electrode may be provided on the substrate 100 and the display panel. For example, the first substrate 510 may be provided on the substrate 100, and the first touch electrode 310 may be provided on the first substrate 510. Further, the second touch electrode 320 may be provided on the 1-2$^{nd}$ substrate 620 of the display panel.

Figure 15:
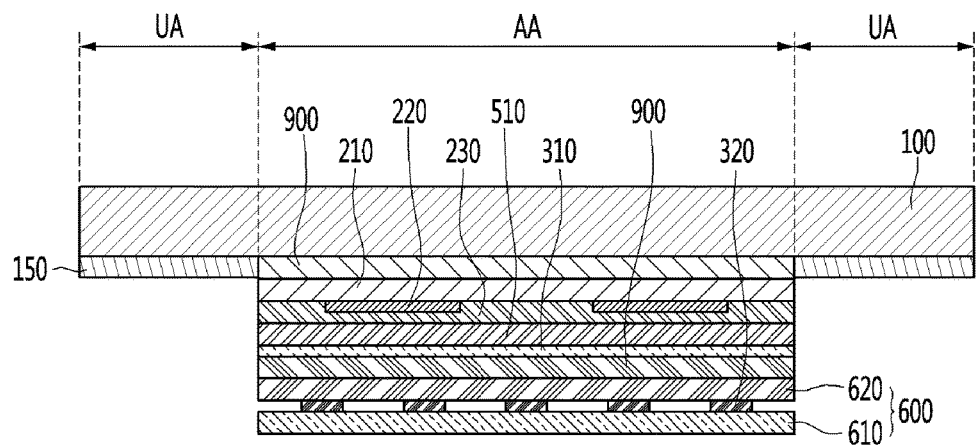

Referring to FIG. 15, the touch electrode may be provided on the substrate 100 and the display panel. For example, the first substrate 510 may be provided on the substrate 100, and the first touch electrode 310 may be provided on the first substrate 510. Further, the second touch electrode 320 may be provided between the 1-1$^{st}$ substrate 610 and the 1-2$^{nd}$ substrate 620 of the display panel.

FIG. 11 is an example of a touch device which may be a portable terminal. The portable terminal may include an effective region AA and an ineffective region UA. A touch signal may be detected in the effective region AA when a finger or the like touches the effective region AA, and a command icon pattern, a logo, and the like may be formed in the ineffective region. Referring to FIG. 10, a touch device may include a flexible device which is flexible. Accordingly, the touch device including the flexible device may be a flexible touch device, and the touch device may be curved or bent by a user's hand. Such a flexible touch device may be applied to a wearable touch device such as a smart watch or the like.

Figure 19:
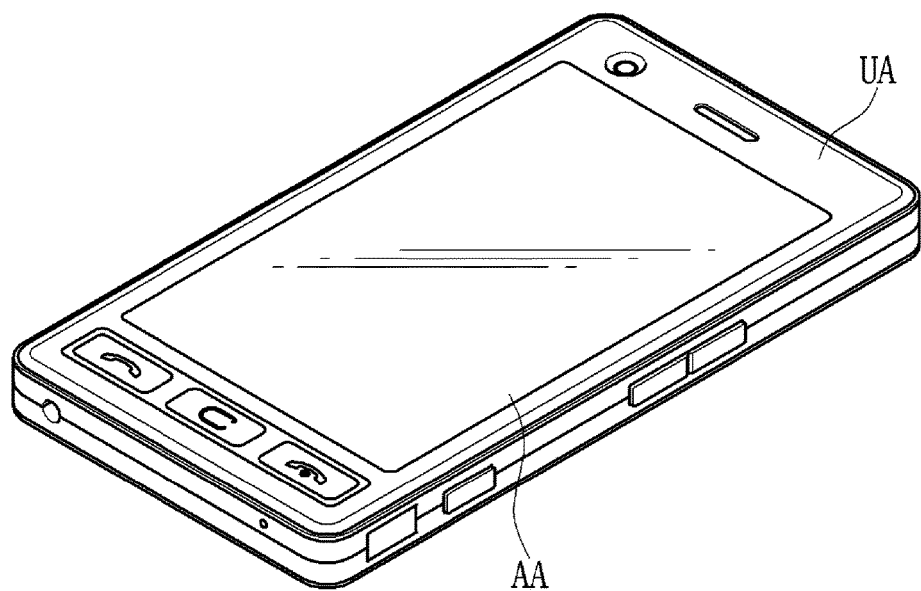
FIG. 19 to FIG. 23 are views illustrating examples of a touch device to which the touch device according to embodiments may be applied.

FIG. 19 is an example of a touch device which may be a portable terminal. The portable terminal may include an effective region AA and an ineffective region UA. A touch signal may be detected in the effective region AA when a finger or the like touches the effective region AA, and a command icon pattern, a logo, and the like may be formed in the ineffective region.

Figure 20:
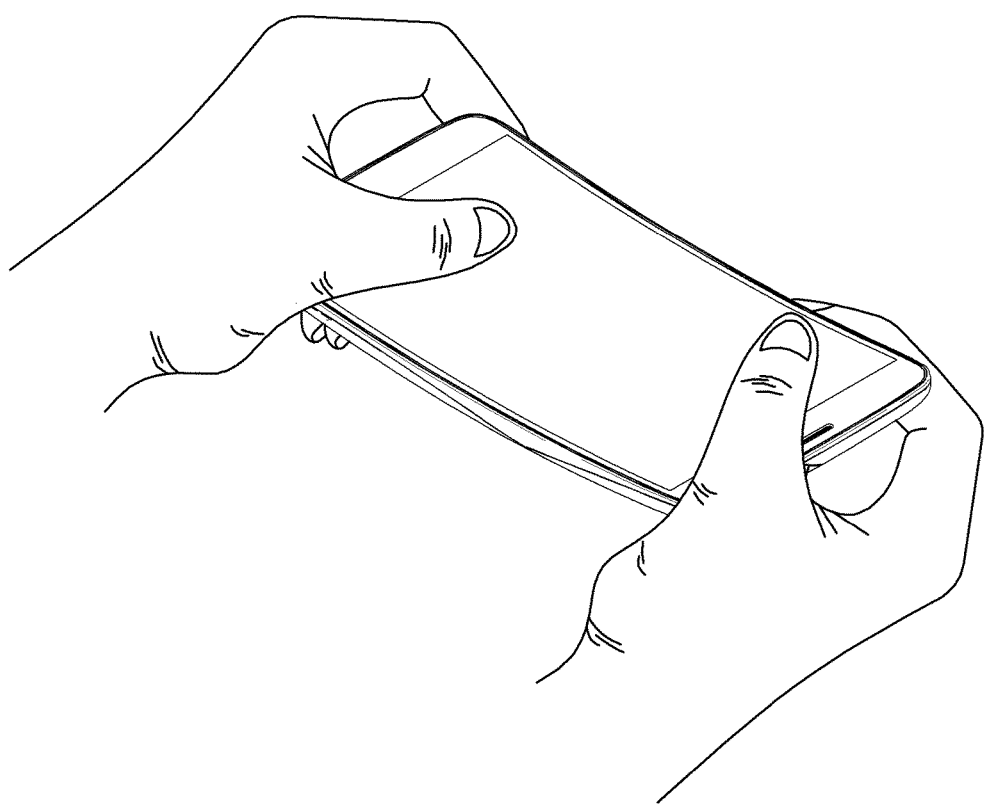
Figure 21:
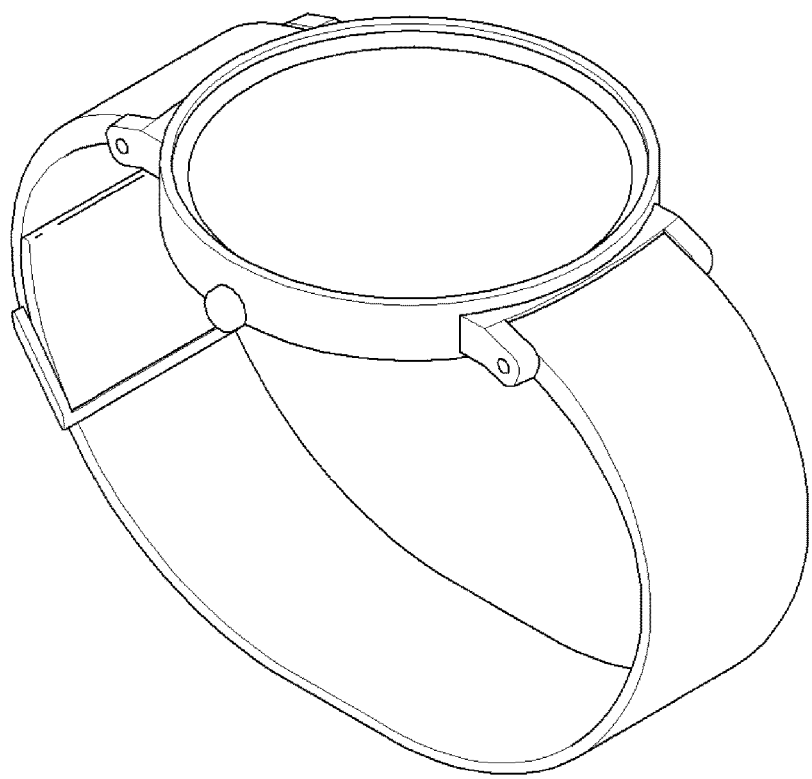
Figure 22:
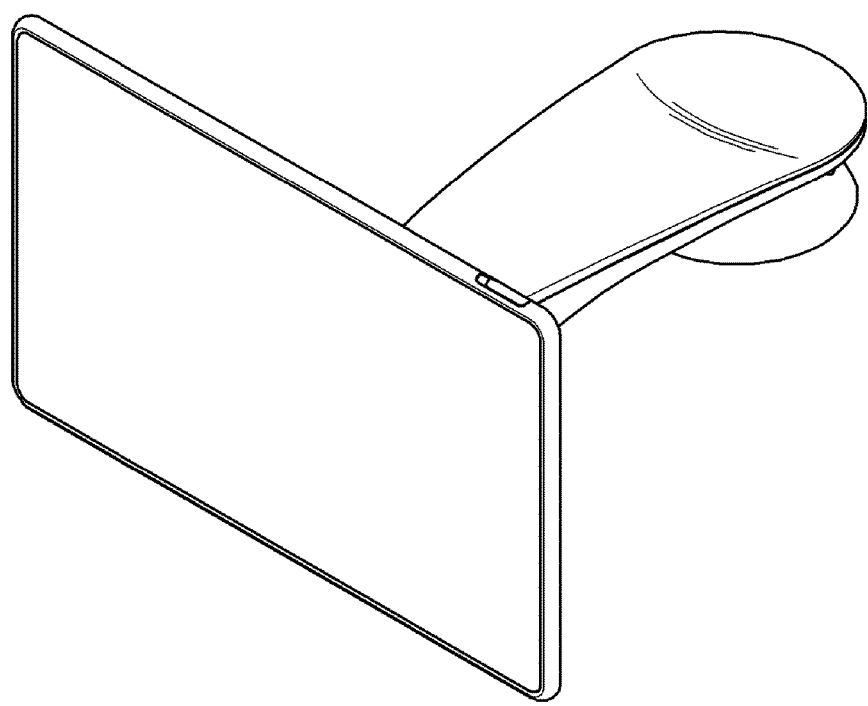

Referring to FIG. 20 and FIG. 21, a touch device may include a flexible device which is flexible. Accordingly, the touch device including the flexible device may be a flexible touch device, and the touch device may be curved or bent by a user's hand. Such a flexible touch device may be applied to a wearable touch device such as a smart watch or the like. Referring to FIG. 22, such a touch device may be applied to a vehicle navigation system in addition to a portable terminal or the like including the touch device.

Figure 23:
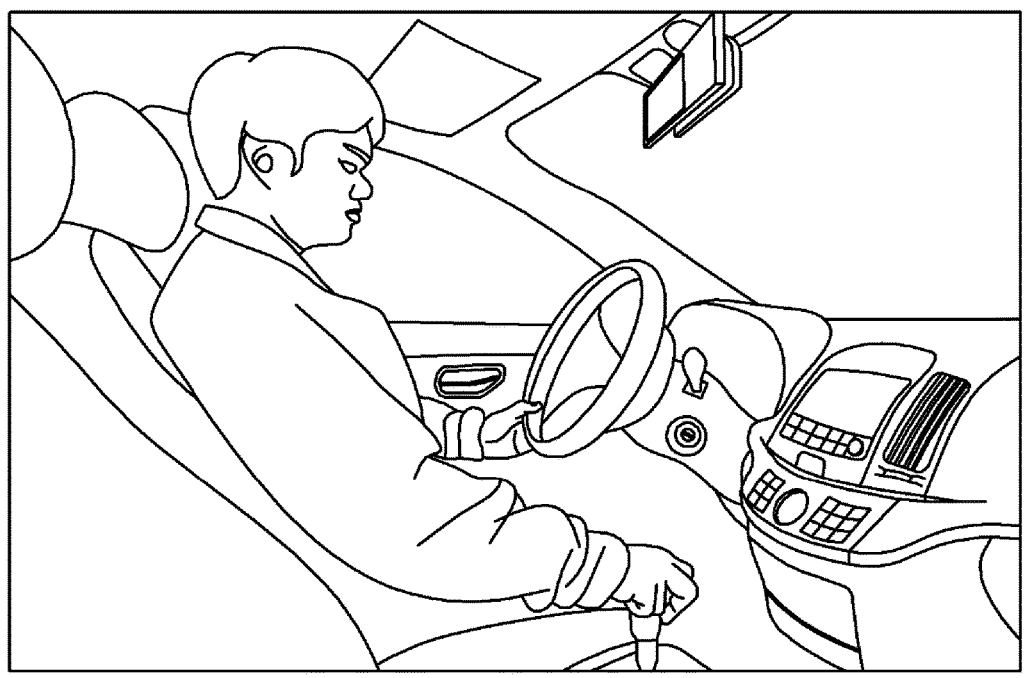

Referring to FIG. 23, such a touch device may be applied inside a vehicle. The touch device may be applied to various portions, to which the touch device may be applied, in the vehicle. Accordingly, the touch device may be applied to a dashboard and the like to implement a center information display (CID) in addition to being applied to a personal navigation display (PND). However, the embodiment is not limited thereto, and such a touch device may also be used for various electronic products.

In the touch device according to embodiments, an electrode that directly detects a pressure can be provided on the substrate. The pressure detecting electrode can be provided on the effective region of the substrate. Accordingly, the substrate and the pressure detecting electrode can be integrated with each other. In the touch device according to the embodiment, a separate pressure detecting layer which detects the pressure can be omitted. Therefore, an increase in a thickness of the touch device due to the separate pressure detecting layer can be prevented, and the touch device having a slim thickness can be realized.

According to embodiments disclosed herein, a touch window may include a cover substrate including an effective region and an ineffective region, and a pressure detection member provided on the effective region, wherein the pressure detection member may include a plurality of pressure detecting patterns provided to be spaced apart from each other, and the plurality of pressure detecting patterns may include a piezoelectric material.

In the touch window according to embodiments, a plurality of pressure detecting patterns may be provided on the cover substrate to be spaced apart from each other. Each of the pressure detecting patterns may be provided in an imaginary unit region of the cover substrate, and the pressure detecting patterns which are spaced apart from each other and provided in every unit region may be provided on the cover substrate. Therefore, when a pressure is applied on the cover substrate by an input device, the pressure and/or an intensity of the pressure may be detected at a position of a region in which the pressure is applied.

The touch window according to embodiments may detect the pressure by the plurality of pressure detecting patterns provided on the cover substrate and may also accurately detect a position at which the pressure is applied, and thus the pressure and the position at which the pressure is applied may be accurately detected with only the pressure detection member. Since the pressure detecting patterns are provided at each of regions, the pressure may be detected at each of the regions with uniform sensitivity, and thus entire pressure detecting sensitivity of the touch window may be enhanced.

According to embodiments disclosed herein, a touch window may include a substrate including an effective region and an ineffective region, and at least one pressure detection member provided on the effective region, wherein the pressure detection member may include at least one pressure detecting electrode provided on the effective region of the substrate, a wiring electrode connected to the pressure detecting electrode and a protective layer provided on the pressure detecting electrode, and the pressure detecting electrode may be in a spiral shape. Furthermore, since the pressure detecting electrode is provided on the effective region of the substrate, an arrangement position of the touch detecting electrode is not limited, and thus the present disclosure can be applied to various types of touch devices.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
    a substrate including an active region and an inactive region; and
    a pressure detection member provided on the active region,
    wherein the pressure detection member includes a plurality of pressure detecting patterns,
    wherein the plurality of pressure detecting patterns are provided to be spaced apart from each other, and each of the plurality of pressure detecting patterns include a piezoelectric material,
    wherein the pressure detecting patterns include a first pressure detecting pattern and a second pressure detecting pattern provided adjacent to the first pressure detecting pattern on one surface of the substrate,
    wherein pressure is applied at a pressure region having a particular surface area on one surface of the substrate,
    wherein a size of a region in which the pressure region overlaps the first pressure detecting pattern is larger than a size of a region in which the pressure region overlaps the second pressure detecting pattern, and
    wherein at least one of a pressure or the intensity of the pressure is detected at a region in which the first pressure detecting pattern is provided.

2. The touch window according to claim 1, wherein the plurality of pressure detection members are provided at similar intervals as each other or different intervals from each other.

3. The touch window according to claim 1, wherein the plurality of pressure detecting patterns are arranged to extend in a row and a column of the substrate.

4. The touch window according to claim 1, wherein the pressure detection is transparent.

5. The touch window according to claim 1, wherein the pressure is applied by an input device on the one surface of the substrate, and the substrate includes another surface opposite to the one surface.

6. The touch window according to claim 1, wherein the plurality of pressure detecting patterns further include a third pressure detecting pattern and a fourth pressure detecting pattern,
    wherein the size of the region in which the pressure region overlaps the first pressure detecting pattern is larger than a size of a region in which the pressure region overlaps the third pressure detecting pattern, and
    wherein the size of the region in which the pressure region overlaps the first pressure detecting pattern is larger than a size of a region in which the pressure region overlaps the fourth pressure detecting pattern.

7. The touch window according to claim 1, wherein an interval between the plurality of pressure detecting patterns is 5 mm or less.

8. The touch window according to claim 1, further comprising a wiring electrode connected to the plurality of pressure detecting patterns, and a printed circuit board connected to the wiring electrode,
    wherein the wiring electrode includes a transparent conductive material.

9. The touch window according to claim 1, wherein the substrate includes a cover substrate.

10. The touch window according to claim 1, wherein an interval between the pressure detecting patterns is 1 mm to 5 mm.

11. The touch window according to claim 1, wherein the substrate includes a first region, a second region which faces the first region, and a third region and a fourth region which connect the first region and the second region and face each other,
    wherein an interval between the pressure detecting patterns is gradually reduced from the first region toward the second region.

12. The touch window according to claim 1, wherein the substrate includes a first region, a second region which faces the first region, and a third region and a fourth region which connect the first region and the second region and face each other,
    wherein a density of the pressure detecting patterns is increased from the first region toward the second region.

13. The touch window according to claim 1, wherein respective sizes of regions in which the pressure detecting patterns overlap the pressure region are different according to each of the patterns.

14. The touch window according to claim 1, further comprising a touch electrode under the pressure detection member.

15. A touch device comprising;
    a touch window of claim 1; and
    a display device disposed under the touch window.

* * * * *